US011975268B2

(12) United States Patent
Eder et al.

(10) Patent No.: US 11,975,268 B2
(45) Date of Patent: May 7, 2024

(54) USER INPUT METHOD AND APPARATUS

(71) Applicant: Sony Interactive Entertainment Inc., Tokyo (JP)

(72) Inventors: Michael Eder, London (GB); Philip Cockram, London (GB); Danjeli Schembri, London (GB); Calum Armstrong, London (GB); William Michael James Hollingsworth, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/459,105

(22) Filed: Aug. 27, 2021

(65) Prior Publication Data

US 2022/0062773 A1    Mar. 3, 2022

(30) Foreign Application Priority Data

Sep. 2, 2020 (GB) .................................. 2013760

(51) Int. Cl.
*A63F 13/00* (2014.01)
*A63F 13/79* (2014.01)
*A63F 13/86* (2014.01)
*G06T 13/20* (2011.01)
*G06T 13/40* (2011.01)
*G06T 13/80* (2011.01)

(52) U.S. Cl.
CPC .............. *A63F 13/79* (2014.09); *A63F 13/86* (2014.09); *G06T 13/205* (2013.01); *G06T 13/40* (2013.01); *G06T 13/80* (2013.01)

(58) Field of Classification Search
CPC .......... A63F 13/87; A63F 13/86; A63F 13/30; A63F 13/335; A63F 13/79
See application file for complete search history.

(56) References Cited

U.S. PATENT DOCUMENTS

| | | |
|---|---|---|
| 2009/0040231 A1 | 2/2009 | Sano |
| 2010/0070858 A1 | 3/2010 | Morris |
| 2010/0306655 A1 | 12/2010 | Mattingly |
| 2011/0225514 A1 | 9/2011 | Goldman |
| 2017/0003740 A1 | 1/2017 | Verfaillie |
| 2017/0171614 A1* | 6/2017 | el Kaliouby ........... G16H 50/70 |
| 2019/0114485 A1* | 4/2019 | Chan ..................... G11B 27/031 |
| 2019/0262723 A1 | 8/2019 | Trombetta |

FOREIGN PATENT DOCUMENTS

WO    2007098560 A1    9/2007

OTHER PUBLICATIONS

Combined Search Report and Examination Report for corresponding GB Application No. 2013760.0, 9 pages, dated Feb. 26, 2021.
Extended European Search Report for corresponding EP Application No. 21190739.9, 7 pages, dated Jan. 24, 2022.
Communication Pursuant to Article 94(3) EPC, for corresponding EP Application No. 21190739.9, 5 pages, dated Mar. 6, 2024.

* cited by examiner

*Primary Examiner* — David L Lewis
*Assistant Examiner* — Eric M Thomas
(74) *Attorney, Agent, or Firm* — Matthew B. Dernier, Esq.

(57) ABSTRACT

A user input method includes the steps of inputting real events arising from a user acting as a spectator of content, analysing the real events to estimate user sentiment, and modifying an aspect of computer-controlled character behaviour in response to estimated user sentiment.

14 Claims, 3 Drawing Sheets

USER INPUT METHOD AND APPARATUS

BACKGROUND OF THE INVENTION

Field of the Invention

The present invention relates to a user input method and apparatus.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In a number of different types of videogame, there are opportunities for users to spectate. For example, in sports simulations where the user may manage one or more teams, a game may show matches played out according to the properties of the respective teams, which the user may then watch. Similarly, in multiplayer games if a player is eliminated, they may still watch the progress of other players (and/or so-called bots, being computer-controlled non-player characters). Similarly in multiplayer games, a user may not directly participate at all, but simply watch the progress of other players. In one format this may occur for example when watching e-sports.

Typically spectating in this manner is an isolated and passive activity, as the user simply watches what occurs on screen from their own home. However by contrast real-world spectating is typically a communal and interactive activity. It would be desirable to make videogame spectating feel more like real-world spectating.

The present invention seeks to alleviate or mitigate this desire.

SUMMARY OF THE INVENTION

Various aspects and features of the present invention are defined in the appended claims and within the text of the accompanying description and include at least in a first aspect, a user input method in accordance with claim 1, and in another aspect, a user input apparatus in accordance with claim 13.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A user input method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, a user input apparatus is provided. This apparatus may take the form of a videogame console (such as a Sony® PlayStation 4® or PlayStation 5® entertainment device) in the case where the user input method is implemented locally, or may take the form of a server videogame consoles in the case with the user input method is implemented centrally.

Figure 1:
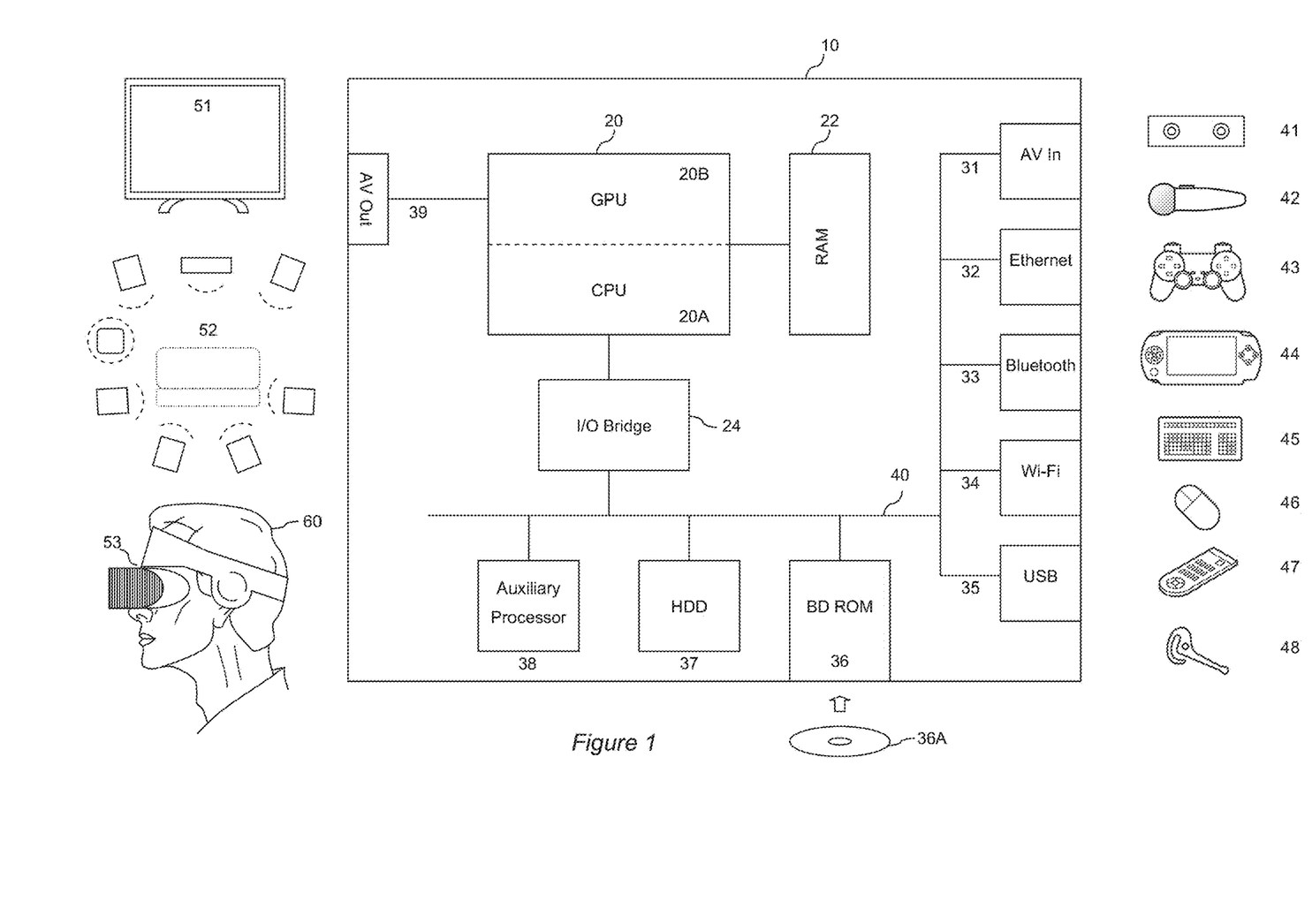
FIG. 1 is a schematic diagram of an entertainment device, in accordance with embodiments of the present description.

Referring now to the drawings, wherein like reference numerals designate identical or corresponding parts throughout the several views, then as a non-limiting example of a videogame console for the purposes of explanation, FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style videogame controllers 42 such as the PlayStation® Move and conventional handheld videogame controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD® 9.0. The operating system may run on the CPU 20A, the auxiliary processor 38, or a mixture of the two. The operating system provides the user with a graphical user interface such as the PlayStation® Dynamic Menu. The menu allows the user to access operating system features and to select games and optionally other content.

In an embodiment of the present description, real events arising from the user acting as a spectator, and game events arising from the operation of the game, are used to drive the behaviour of virtual spectators incorporated into the game. Optionally in addition these real and game events may be used to modify camera behaviour and/or the actions of one or more computer-controlled non-player characters or NPCs, as described later herein.

Real events are detected peripherals of the entertainment device and/or separate devices that either interact with entertainment device or with the server, depending upon whether the implementation is local or central.

For example the entertainment device 10, operating under suitable software instruction, is operable to monitor for such real events from a user, which may take any suitable form indicative of the emotion of user and/or an utterance or other communication by them.

Hence inputs to the entertainment device may be received from one or more peripherals of the entertainment device, or peripherals operably linked to the server (either directly via the Internet or via an entertainment device).

These may include for example for the purposes of audio a headset 48 or another microphone (for example on a videogame controller 44 or on a mobile phone wirelessly coupled to the entertainment device either directly or via a home network, or coupled to the server via the Internet). For the purposes of video, a video camera 41 or other camera (again similarly for example on the mobile phone). For the purposes of gesticulation, any suitable device comprising an accelerometer or other motion detection technique such as again a mobile phone, or videogame controller (44, 42), or suitable analysis of captured video. For purposes of text, any suitable text input mechanism such as again a mobile phone, or keyboard 45, or a videogame controller 44 for example in conjunction with an on-screen keyboard.

Other inputs and peripherals may similarly be considered by the skilled person, such as for example head movement and/or eye expression or gaze captured by a head mounted device, or biometric feedback such as heart rate, breathing rate, muscle tension, skin conductivity and the like received from appropriate biometric sensors.

Inputs from one or more of these peripherals (which may be integral or separate to the entertainment device as appropriate) or other devices may then be analysed to determine the user's engagement with the game as a spectator.

For voice inputs (for example captured by microphone as an audio only input or as part of a video input) one or more different analyses may be performed.

Firstly, speech to text processing may be performed to provide text for content analysis as described later herein.

Secondly, voice analysis based on properties such as volume, pitch, speed, tremble/tremolo and the like may be performed to determine the sentiment or emotion of the user, such as for example anger, joy, fear, sadness and the like.

For video inputs again one or more different analyses may be performed.

Firstly, facial analysis may be performed to recognise the expressed sentiment or emotion of the user, such as for example anger, joy, fear, sadness and the like.

Secondly, gestural analysis may be performed to specific gestures (for example gesticulating towards the opponent's goal), or again to determine from body language the expressed sentiment or emotion of the user, such as for example anger, joy, fear, sadness and the like.

For accelerometer inputs, similar gestural analysis may be performed.

Similarly biometric sensors may provide an indication of current levels of excitement or agitation.

One or more of such inputs (e.g. voice tone, facial expression, body language, gesture) may be used as inputs to a sentiment analysis system. Typically such a system is a trained machine learning algorithm (e.g. neural network) for which appropriate combinations of one or more such inputs or representations thereof have been associated through training with a selection of corresponding sentiment emotion types such as for example anger, fear, joy, sadness, analytical/concentrating, confident, and tentative.

Meanwhile text, whether typed or generated via speech to text processing, may similarly be used as inputs to a sentiment analysis system. Typically in this case as preparatory steps filler words such as 'a', 'the' etc. are removed, and the remaining words are stemmed and/or converted to a consistent tense and form. In any event, typically the sentiment analysis system is again a trained machine learning algorithm (e.g. neural network) for which such input words or representations thereof have been associated through training with a selection of corresponding sentiment emotion types such as for example anger, fear, joy, sadness, analytical/concentrating, confident, and tentative.

In this way, through one or more of the above modes of expression of the user and suitable subsequent analysis, the user's current sentiment/emotion can be estimated.

Game events related aspects of the game is not necessarily part of the rules of the game but may be a source of particular interest to the user; hence for example if a player falls over, or gesticulates in celebration or sorrow, this may be a game event of interest to the user whilst being unrelated to gameplay per se. Meanwhile other game events may relate to the specific game. Hence for example in the case of soccer, game events may include the scoring of a goal, the committing of a foul, taking a corner or a penalty, the ball being within a predetermined distance from a goal, and/or the ball moving outside the pitch. Furthermore other game events may relate to the relationship between the game and the notional location of spectators; hence for example if spectators surround the pitch, then a game event relevant to spectators on a certain side of the pitch is if the ball comes within a predetermined distance from those spectators, or a particular player comes within the predetermined distance of those spectators; for example a player who has just scored a goal or committed a foul, or a player who is notionally more popular or famous than other players.

The entertainment device or the server as appropriate comprises spectator analysis logic (for example a central processor operating under suitable software instruction) that analyses the relationship between game events and real events to determine how to modify aspects of the game.

This may be done to modify one or more of spectator animation and/or audio, camera position, and in game player behaviour (for example of computer-controlled NPCs).

Figure 2:
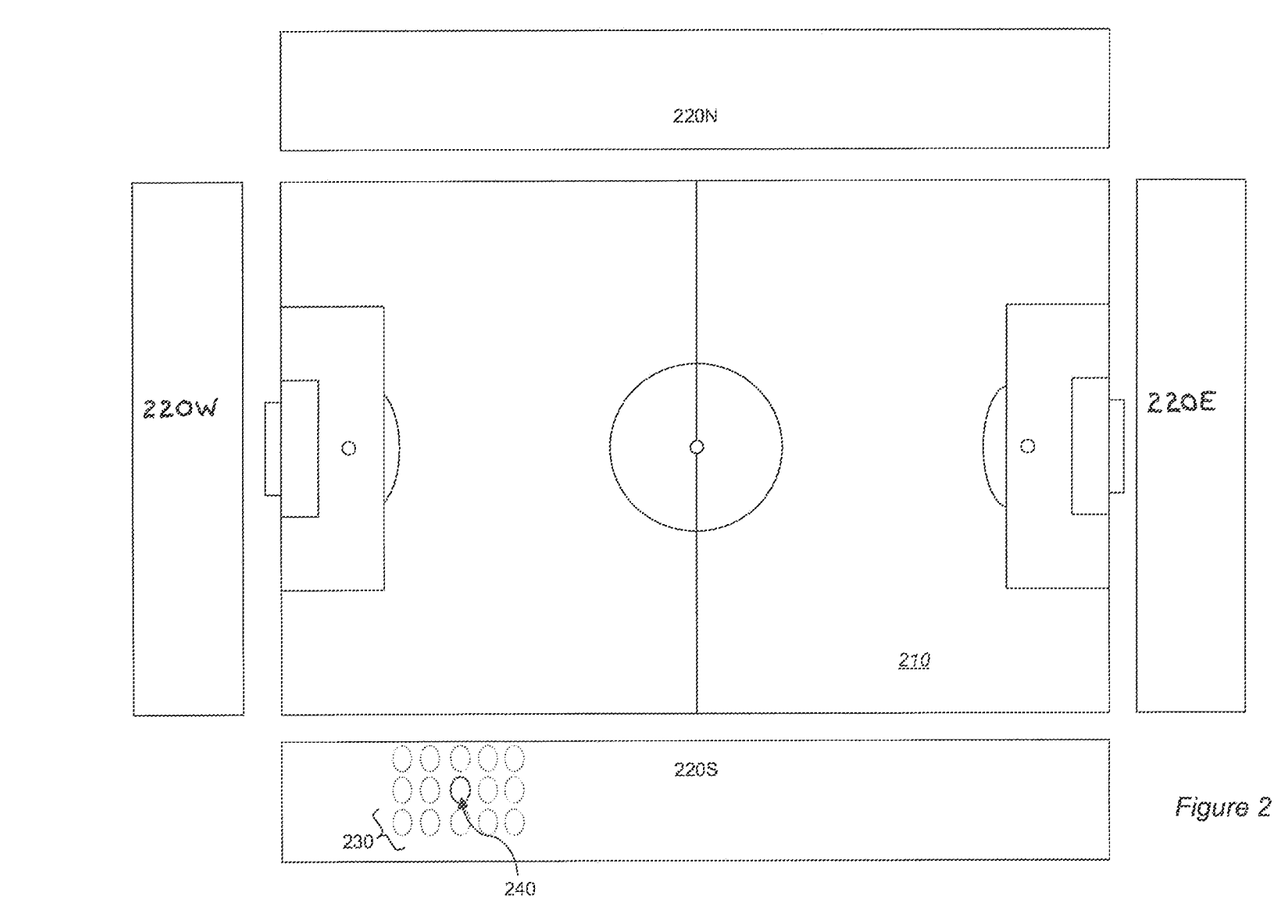
FIG. 2 is a schematic diagram of a sports arena comprising crowd areas and a notional position of a user acting as a spectator within the crowd, in accordance with embodiments of the present description.

By way of a non-limiting example, referring now to FIG. 2 this shows a football pitch 210 surrounded by four spectator areas 220 North South East and West (N,S,E,W).

The spectator areas are typically occupied by crowds of non-player characters. These characters may be relatively crude representations of people, particularly when the crowd as shown beyond a predetermined distance from a virtual camera driving display of the game. In cases where representations are relatively crude, then as the virtual camera gets closer to the ground, at one or more predetermined distances the representations of people in the crowd may be improved, for example by use of more detailed textures and/or geometry, and the use of new or additional animation.

In this manner, the or each spectator area may comprise a large crowd. The crowd in a given spectator area may be a mix of supporters for different teams, or maybe predominantly supporters of one team or exclusively supporters for one team.

Optionally, one of the spectator areas may comprise the notional position 240 of a user when acting as a spectator. In addition, there may be a subset of the crowd 230 within a predetermined distance or configuration around the notional position of the user.

The spectator analysis logic may then use game event data and real event data (in particular sentiment analysis results and keyword analysis results from typed or spoken input) to modify in game animation.

Game event data may be used as a basis for controlling crowd animations and/or audio; as an example game event a goal may result in parts of the crowd performing celebration animations and cheering, whilst other parts the crowd perform animations indicating sadness, and/or booing. Hence for example the west and south spectator areas may support one team, whilst the north and east spectator areas support the other.

Similarly as an example game event, when the ball, or one or more other objects relating to the game that are selected to be crowd triggers (for example a notionally famous and popular player, or the referee, or a team mascot) come within a predetermined distance of one of the spectator areas, then the crowd in that area may become more voluble, for example with ambient chants, whistles, songs, calls, etc., and/or corresponding animations.

Real event data (for example user sentiment and/or keywords) may similarly be used as a basis for controlling crowd animations and/or audio; for example if the user starts cheering or indicating excitement or happiness using any of the modalities described previously herein, then the crowd supporting their team may start cheering and appearing happy as well. Similarly if the user is frustrated or despondent, the crowd supporting their team may display associated animations and/or audio.

This may be achieved for example by using a look-up table or similar rule or heuristic associating the identifiable sentiments with corresponding crowd animations (or a set of appropriate crowd animations from which random animations may be selected, to provide variation). Such a look-up table may be used in a winner-takes-all manner, so that if the sentiment is 'happy' then happy-related animations are used. Meanwhile if the sentiment analysis system provides confidence levels for each sentiment, then for example the crowd may be divided up according to the relative likelihood of a given sentiment being expressed—e.g. 70% happy and 30% confident, or 60% sad and 40% fearful. A similar approach may be used for audio selected for the crowds.

Meanwhile the optional non-player character spectators 230 proximate to the user's notional position within the crowd may similarly exhibit animations and/or audio that echoes the sentiments of the user, either on a winner-takes all based or according to a distribution based upon the relative confidence in a plurality of sentiments. These animations and audio may be more detailed than those used by the wider crowd, if they can be more clearly seen by the user.

Optionally however one or more of these NPC spectators may also interact with the notional position of the user (for example if that position is shown in a first person view) or the user's avatar at that position (for example if shown in a third person view), for example patting them on the back in celebration, turning to smile at them or commiserate with them, and/or making audible comments selected as being suitable to the user's estimated sentiment. Again this may be implemented using a look-up table or similar rule or heuristic to associate sentiment with these more detailed actions or interactive behaviours.

Similarly where the user has an in-crowd avatar (for example if shown a third person view), then that avatar may similarly be animated and/or have associated audio played in response to the user's estimated sentiments.

In addition to sentiment, optionally the user's utterances may influence the crowd. For example calling out certain key words like 'pass' or 'shoot' may result in audio of crowds calling out these terms being played, so that the user feels like they instigated and joined in with a cry from the crowd. Similarly other vocalizations may be copied or act as triggers, such as booing, cheering or laughing, beyond any associated sentiment analysis, as being indicative of how the crowd should express the same sentiment. Along with audio, appropriate animations may also be used.

The user's utterances, if recognised as corresponding to a keyword or key phrase, may also trigger word or phrase specific responses from one or more proximate NPC spectators, for example causing an NPC spectator to reply to a particular phrase with an appropriate spoken or gestural response, or a selected one from among a set of appropriate responses; or agreeing with the user's utterance, or repeating it as appropriate, or laughing or the like, together with appropriate animations.

Optionally the user's utterances may influence the game too. For example calling out certain key words like 'pass' or 'shoot' may result in those actions being more likely to occur. The increase in likelihood may depend upon the proximity of the relevant NPC player to the user's position in the crowd (i.e. a notional likelihood of being heard), and/or may depend on whether the crowd reacts and repeats the key phrase or otherwise reacts positively to it (which itself may be based upon a probability value, or other factors such as time since the crowd last reacted in this way or last influenced a player). In this case the crowd call may have a greater range of influence over the pitch, or distance may simply not be considered. The likelihood of an NPC of following the user's prompts may also be a function of other factors, such as how close the scores of the opposing teams are, or how much time is left in the game (e.g. the user may have much more influence on the crowd and/or NPC players toward the end of a closely matched game than earlier on).

NPCs may be animated to glance at the user if the user calls out to them when they are close. Similarly NPCs could play less well, or misbehave, if distracted by the user (and/or possibly the crowd, if a corresponding crowd audio and/or animation is triggered by the user's actions); hence for example booing an opponent NPC may distract them, or cause them to commit a foul and subsequently be disciplined by the referee. Hence the response to the user's call may be more complex than a simple animation, but may trigger a new set of actions and behaviours, such as committing a foul and getting booked.

Hence more generally analysis of the user's response as a spectator to the game can be used to modify in game behaviour. The user's response can be captured through any suitable input modality. The analysis can relate to user sentiment and/or user keywords as appropriate. The in-game behaviour can correspond to the selection, modification, or generation of appropriate audio and/or animation, or other actions. The modification to in game behaviour can occur within a virtual crowd (i.e. not as part of the game being represented within the game itself) and/or as part of the game being represented.

In a similar manner to modifying NPC behaviour in the crowds or in the game based on in game events and/or real events (e.g. user sentiment or keywords), alternatively or in addition in game events and/or real events can also modify camera behaviour.

For example, a game may comprise a number of different cameras (more accurately typically a single virtual camera, but configured to adopt different positions, movements, and/or fields of view, etc., to represent multiple different cameras).

Hence during kick-off or other events likely to require wide coverage such as a goalkick into the field, a sky camera may be used providing a high vantage point over the pitch.

For play in midfield (i.e. not near the goal) a panning side camera may be used to traverse the pitch left to right (or East-West according to the nomenclature of FIG. 2), roughly tracking the ball progress along the major axis of the pitch.

For an interesting event such as a throw-in, corner, tackle or foul, or player injury, a follow camera may be used to track the object of interest wherever they go on the pitch (typically the ball, but as appropriate the injured player and/or the perpetrator of the foul).

Meanwhile if the ball goes near a goal, follow camera may be used again to track the ball.

In the event of a goal, once the goal has occurred to the camera may switch to a crowd camera (i.e. positioned on the pitch facing out into the crowd) and/or a spectator camera with either a first person view positioned at the notional location of the user within the crowd, or a third person view positioned with respect to an avatar of the user within the crowd.

Will be appreciated that the above camera selection criteria are merely exemplary rules based on in-game events, and a non-limiting. It will also be appreciated that different rules will be appropriate for different types of game.

In addition to game events, optionally the camera may be selected/controlled by real events (e.g. user sentiment or keywords). For instance, if the user is happy about a goal being scored, the camera may focus on non-player characters who are also celebrating on the pitch, or portions of the crowd who were celebrating. Meanwhile if the user is sad, the camera may focus on non-player characters who are also sad, or portions the crowd who are sad.

Similarly, if the user starts shouting, chanting or in some other way behaving notably (for example gesticulating wildly or cheering emphatically), the camera may switch to a crowd camera (for example a region of the crowd comprising the user's notional position), or switch to the in crowd camera at the user's point of view or encompassing the user's avatar. Alternatively or in addition, a second virtual camera may be used to identify the user's avatar with the crowd and show this image within an in-game screen for example on a so-called Jumbotron® virtually represented within the game arena). In this way, notable behaviour of the user is optionally recognised individually, as well as potentially triggering corresponding crowd actions or reactions.

It will be appreciated that the virtual camera may similarly be modified in other ways. For example, the spectator analysis logic may learn a correspondence between certain camera viewpoints and certain game events, and a degree of engagement of the user with the displayed content, based upon the sentiment analysis and/or any vocal or typed communication, and modify the virtual camera rules to favour combinations of camera type and game event that appear to better engage the user.

Hence more generally analysis of the user's response as a spectator to the game can be used to modify virtual camera behaviour. The user's response can be captured through any suitable input modality. The analysis can relate to user sentiment and/or user keywords as appropriate. The virtual camera behaviour can correspond to the selection of virtual camera type, and selection of an object of interest. The modification can relate to which selections are made, and also to the rules of selection.

Finally, it will be appreciated that in some games there will be more than one real-world spectator watching the same game. This may be due to multiple participants in a multiplayer game having been eliminated, and now all watching the remaining play, or because multiple players have signed in to watch a game being played by nominated players (for example in an e-sports scenario, or where users invite people from their friends list to watch them play), or because multiple players are watching a game being played by non-player characters (for example a multiplayer sports management simulation), or any suitable combination of the above.

In this case, optionally each of these users may have their own virtual cameras (for example rendered locally on the entertainment device). Each users virtual camera may follow rules as described elsewhere herein, but may for example reflect the fact that different user support different teams within the game or are notionally located at different paces within the crowd, or may have learned that different users are interested in different aspects of the game, for example based upon estimated degree of engagement as described elsewhere herein. Similarly optionally users may manually select different camera types themselves, and the user's selections in relation to game events may be learned, so that an one user's camera may behave differently to another's in response to the same in game event. Alternatively each of these users may share a common virtual camera, for example being controlled by a server, or a commentator or other individual with privileged camera control, for example in the case of an e-sports session.

In the case where there are multiple real users distributed within the virtual crowd, the crowd may be partitioned into sub-crowds each individually influenced as described elsewhere herein by their respective user. Alternatively or in addition, crowd areas encompassing multiple real users, or the crowd notionally supporting a particular team, or the crowd as a whole, may be influenced by the aggregate sentiment of the players distributed within the crowd. In a similar manner to that described previously, this may take the form of a winner takes all approach, where the predominant sentiment among the plurality of real users drives the virtual crowd response, or alternatively may take proportional response where the crowd responds in a manner reflecting the proportion of real users who are happy, sad, angry etc.; it will be appreciated that where if proportional response is achieved by regional division of the crowd, then it may revert back to the approach of partitioning the crowd into sub crowds individually influenced by respective users.

Again the users, the crowd, or portions thereof, may optionally influence non-player characters playing a game as described elsewhere herein. In this case, optionally the balance of positive and negative user/crowd sentiment or communication may positively or negatively affect the performance of a non-player character; in this way spectating users can compete with each other to influence the behaviour of one or more NPC's and hence potentially outcome of the game, based upon the relative strength of sentiment or other communication they convey.

As noted elsewhere herein, the user input method can be implemented by an entertainment device (typically but not necessarily for an individual user, or may be implemented by a central server.

A central server is often used to administer multiplayer games, and so may be used similarly to administer multi-spectator interactions. In this case, the entertainment device may relay inputs from the user described elsewhere herein to the server, or alternatively may perform local preprocessing of these inputs (for example turning voice inputs into so-called Mel-Cepstrum representations of speech, or any other suitable representation, or isolating and normalising the user's face orientation and size within a video) to reduce upload bandwidth to the server and the processing overhead on the server, or may perform voice to text recognition, facial expression analysis and the like locally the entertainment device, and sending the estimated user sentiment and/or key words/phrases to the server. Alternatively or in addition, an entertainment device may send raw and/or preprocessed input data to a third party server for processing, optionally with appropriate meta data enabling the third party server to convey the results to the administering central server. It will be appreciated that any of the above approaches may be used in combination, for example for different supported input modalities.

The central server may then determine how the crowd or any nonplayer characters are to react based upon individual or aggregate user spectator sentiment or keywords/phrases.

Whether implemented within the entertainment device or the server, or a combination of the two, respective components of the apparatus for example (inputs, analyses and modification elements) may be customisable and modular so that different games or other forms of content can register their own game events (for example via an API or preformatted event list). Some analyses may be prepared or trained in advanced (for example sentiment analysis), and/or may be trained or refined locally in response to the actions of the individual user. Some analyses may be prepared at the entertainment device or server, or may be outsourced to a third party service (for example text-to-speech, sentiment analysis and the like). It will be appreciated that not all forms of input, not all forms of analyses, and not all forms of modification may be required by a particular game or content spectating service to implement the techniques described herein.

It will be appreciated that whilst the above description has used a virtual soccer game as an expert example, the invention is not limited to any particular video game. Furthermore, the invention is not limited to videogames per se; footage of real-life sport may be similarly used, and a virtual crowd provided for the user that responds to the user's estimated sentiment and/or text/utterances as described elsewhere herein. For example, the user may watch the real-life sport using a head mounted display, and when viewing from a notional spectator position, may look away from the footage to see a crowd of virtual spectators around them acting in a manner responsive to their own sentiments and opinions. If the real-life sport is suitably marked up to identify game events (either manually or automatically using machine learning), then the virtual spectators may also respond to game events as described elsewhere herein, and thus not appear to rely on responding to the user's own response to game events. It will be further appreciated that the techniques herein are not limited to games or sport at all; potentially any film or TV content may be viewed by the user, and the user may be accompanied by a virtual crowd of spectators. As noted above the spectators may be out of sight when the user is looking at the content but visible when the user glances to the left or right, or may be superposed, for example in silhouette at the bottom of the screen, so that the user can optionally see behaviours and/or hear comments that respond to the user sentiment and/or typed and/or spoken utterances. Again the TV or film may be marked up (in a similar manner to a laughter track) so that the virtual spectators can also respond to in-content events seemingly independently of the user, as per the techniques discussed elsewhere herein.

Figure 3:
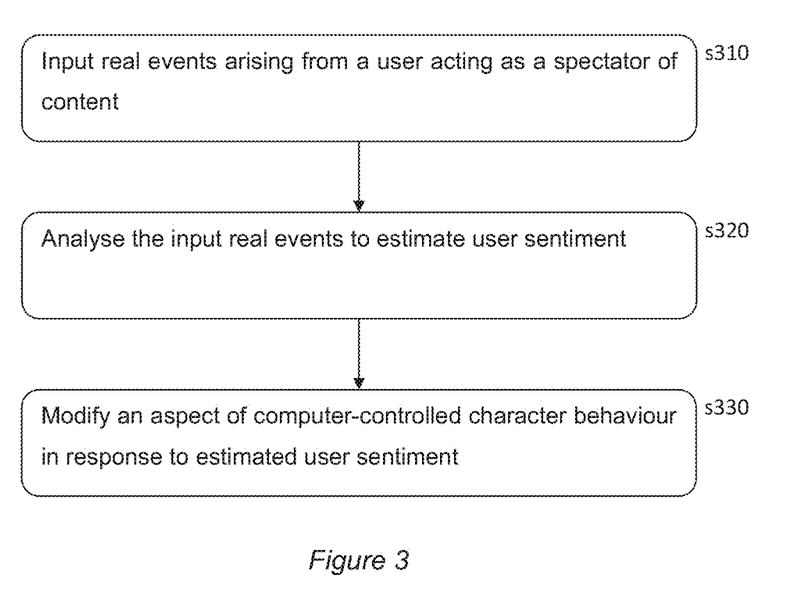
FIG. 3 is a flow diagram of a user input method in accordance with embodiments of the present description.

Turning now to FIG. 3, in a summary embodiment of the present invention a user input method comprises the following steps.

In a first step S310, inputting real events arising from a user acting as a spectator of content. As noted elsewhere herein, these real events may be input by any suitable modality, including voice, image, gesture, words (whether typed or speech to text), or biometric. Meanwhile as noted elsewhere herein the content may be a videogame, or live or recorded footage for example of a sports match, or any other TV or film content.

In a second step S320, analysing the input real events to estimate user sentiment. As noted elsewhere herein, sentiment analysis may take real event inputs and/or representations/abstractions thereof as input to identify a corresponding sentiment or likelihood of respective sentiments based upon a learned association between them (for example embodied in trained a machine learning system).

In a third step S330, modifying an aspect of computer-controlled character behaviour in response to estimated user sentiment. As noted elsewhere herein, this may relate to the animation and/or audio for computer-controlled characters in a crowd of spectators and/or in a local subset of the crowd around the notional position of the user, and in the case of a videogame or similar application including computer-controlled characters who are not spectators (e.g. participants in a game or event being spectators), then they may relate to animation and/or audio relating to the behaviour of such participants.

In an instance of this summary embodiment, the method comprises the following steps. Firstly, inputting content events arising from the content, as described elsewhere herein; and secondly modifying an aspect of computer-controlled character behaviour in response to respective input content events. Hence for example a game event such as a goal may result in celebratory crowd animation and audio.

In the case of this instance, optionally the step of modifying an aspect of computer-controlled character behaviour in response to respective input content events is further modified in response to estimated user sentiment as described elsewhere herein. Hence for example a game event such as a goal may result in a longer celebratory crowd animation and audio if the user also celebrates, but a shorter one if the user does not.

In an instance of this summary embodiment the content is a videogame, and the method comprises the step of modifying a virtual camera in response to content events, as described elsewhere herein.

In the case of this instance, optionally the step of modifying a virtual camera in response to content events is further modified in response to estimated user sentiment. Hence for example in the event of a goal the virtual camera may be positioned near the goal, but may focus on the goal scorer if the user is celebrating, or on the goalkeeper if the user is sad.

In an instance of the summary embodiment, real events comprise one or more selected from the list consisting of vocalizations of the user, gestures of the user, facial expressions of the user, biometric feedback from the user, and words from the user, as described elsewhere herein.

In the case of this instance, optionally the step of analysing the input real events comprises performing sentiment analysis based upon the input real events, as described elsewhere.

In the case of this instance, optionally performing sentiment analysis comprises analysing words from the user for key words or phrases, as described elsewhere herein.

In an instance of this summary embodiment, the step of modifying an aspect of computer-controlled character behaviour in response to estimated user sentiment comprises, as described elsewhere herein, one or more selected from the list consisting of firstly, modifying one or more crowd animations or crowd audio; secondly, modifying one or more crowd animations or crowd audio so as to respond to a key word or phrase from the user; thirdly, modifying one or more crowd animations or crowd audio for a subset of the virtual crowd within a predetermined distance or configuration relative to a notional position of the user within the crowd; and fourthly, modifying one or more crowd animations or crowd audio for a subset of the virtual crowd within a predetermined distance or configuration relative to a notional position of the user within the crowd so as to respond to a key word or phrase from the user.

In an instance of this summary embodiment the content is a videogame, and the step of modifying an aspect of computer-controlled character behaviour in response to estimated user sentiment comprises, as described elsewhere herein, one or more selected from the list consisting of firstly, causing an in-game computer-controlled character to change behaviour as a function of in-game proximity to the user's notional position in the crowd, and an input event; and secondly, causing an in-game computer-controlled character to change behaviour as a function of a modification to a virtual crowd made in response to estimated user sentiment.

In an instance of this summary embodiment a plurality of users act as spectators of the same content; the step of analysing the real events to estimate user sentiment then comprises determining a distribution of user sentiment across the plurality of users, and the step of modifying an aspect of computer-controlled character behaviour in response to estimated user sentiment comprises modifying an aspect of computer-controlled character behaviour in response to the determined distribution of user sentiment across a plurality of users, as described elsewhere herein.

In the case of this instance, an aspect of computer-controlled character behaviour is modified in response to one or more selected from the list consisting of firstly a majority sentiment; and secondly, a proportional representation of sentiments, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in a summary embodiment of the present invention, a user input apparatus comprises at least a first input port (for example Bluetooth® port 33, WiFi® port 34, USB port 35, or AV in port 31) operable to receive inputs corresponding to real events arising from a user acting as a spectator of content; a real event analysis processor (such as CPU 20A and/or GPU 20B) adapted (for example by suitable software instruction) to analyse the inputs to estimate user sentiment; and a character-control processor (such as CPU 20A and/or GPU 20B) adapted (for example by suitable software instruction) to cause a modification an aspect of computer-controlled character behaviour in response to estimated user sentiment.

Such a user input apparatus may thus be adapted (for example by suitable software instruction) to implement the methods and techniques described herein.

It will be appreciated that the above apparatus may take the form of an entertainment device 10 or similar client side videogame console or other entertainment device (such as a computer, smart TV, head mounted display unit, tablet, or smartphone) receiving inputs corresponding to real events from one or more respective peripherals, as described elsewhere herein; and following the previously described analysis, causing a modification of non-player character behaviour for example by the selection of in-application assets such as animation and audio, again as described elsewhere herein.

Alternatively the above apparatus may take the form of a central server (not shown) receiving inputs corresponding to real events either from respective network capable peripherals such as mobile phones, or from other peripherals via a client entertainment device, optionally after pre-processing, e.g. for transmission via the Internet, as described elsewhere herein; and following the previously described analysis, causing a modification of non-player character behaviour for example by transmitting an instruction to a respective client entertainment device, instruction indicating a selection of, or a means or mode by which to select, in-application assets such as animation and audio, again as described elsewhere herein.

In an instance of this summary embodiment, the first input port is operable to receive inputs corresponding to one or more selected from the list consisting of firstly a videogame controller, headset, phone, or video camera for voice; secondly, a phone or video camera for video images; thirdly, a videogame controller, phone, or video camera for gestures; fourthly, a videogame controller, headset, phone, or video camera for words; and fifthly, a videogame controller, or biometric sensor for biometrics.

It will also be appreciated that a user input system may comprise such an entertainment device and any of the above listed peripherals, or may comprise a server and any suitable combination of an entertainment device (or a plurality thereof) operably coupled to any of the above listed peripherals, and/or any of the above listed peripherals that are network capable.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A user input method comprising the steps of:
   receiving, from one or more peripheral devices, inputs corresponding to real events arising from a user acting as a spectator of content, and in which a plurality of users act as spectators of the same content;
   analyzing, using a processor, the inputs to determine a distribution of user sentiment across the plurality of users; and
   presenting the content, the presenting including modifying an aspect of computer-controlled character behavior in response to the determined distribution of user sentiment across a plurality of users; wherein modifying an aspect of computer-controlled character behaviour comprises selection, modification, or generation of appropriate audio and/or animation.

2. A user input method according to claim 1 comprising the steps of:
   inputting content events arising from the content
   modifying an aspect of computer-controlled character behavior in response to respective input content events.

3. A user input method according to claim 2, wherein the step of modifying an aspect of computer-controlled character behavior in response to respective input content events is further modified in response to estimated user sentiment.

4. A user input method according to claim 1, in which the content is a videogame, and the method comprises the step of modifying a virtual camera in response to content events.

5. A user input method according to claim 4, wherein the step of modifying a virtual camera in response to content events is further modified in response to estimated user sentiment.

6. A user input method according to claim 1, in which real events comprise one or more of:
   i. vocalizations of the user;
   ii. gestures of the user;
   iii. facial expressions of the user;
   iv. biometric feedback from the user; and
   iv. words from the user.

7. A user input method according to claim 6, in which the step of analyzing the input real events comprises performing sentiment analysis based upon the input real events.

8. A user input method according to claim 6, in which the step of performing sentiment analysis comprises analyzing words from the user for key words or phrases.

9. A user input method according to claim 1, in which the step of modifying an aspect of computer-controlled character behavior in response to estimated user sentiment comprises one or more of:
   i. modifying one or more crowd animations or crowd audio;
   ii. modifying one or more crowd animations or crowd audio so as to respond to a key word or phrase from the user;
   iii. modifying one or more crowd animations or crowd audio for a subset of the virtual crowd within a predetermined distance or configuration relative to a notional position of the user within the crowd; and
   iv. modifying one or more crowd animations or crowd audio for a subset of the virtual crowd within a predetermined distance or configuration relative to a notional position of the user within the crowd so as to respond to a key word or phrase from the user.

10. A user input method according to claim 1, in which the content is a videogame; and the step of modifying an aspect of computer-controlled character behavior in response to estimated user sentiment comprises one or more of:
    i. causing an in-game computer-controlled character to change behavior as a function of in-game proximity to the user's notional position in the crowd, and an input event; and
    ii. causing an in-game computer-controlled character to change behavior as a function of a modification to a virtual crowd made in response to estimated user sentiment.

11. A user input method according to claim 1, wherein an aspect of computer-controlled character behavior is modified in response to one or more of:
    i. a majority sentiment; and
    ii. a proportional representation of sentiments.

12. A non-transitory, computer readable storage medium containing a computer program comprising computer executable instructions, which when executed by a computer system, cause the computer system to perform a user input method comprising the steps of:
    receiving, from one or more peripheral devices, inputs corresponding to real events arising from a user acting as a spectator of content, and in which a plurality of users act as spectators of the same content;
    analyzing, using a processor, the inputs to determine a distribution of user sentiment across the plurality of users; and
    presenting the content, the presenting including modifying an aspect of computer-controlled character behavior in response to the determined distribution of user sentiment across a plurality of users; wherein modifying an aspect of computer-controlled character behaviour comprises selection, modification, or generation of appropriate audio and/or animation.

13. A user input apparatus, comprising
    at least a first input port operable to receive, from one or more peripheral devices, inputs corresponding to real events arising from a user acting as a spectator of content, and in which a plurality of users act as spectators of the same content;
    a real event analysis processor operating to analyze the inputs to determine a distribution of user sentiment across the plurality of users; and
    a character-control processor operating to cause a modification an aspect of computer-controlled character behavior in response to the determined distribution of user sentiment across a plurality of users; wherein modifying an aspect of computer-controlled character behaviour comprises selection, modification, or generation of appropriate audio and/or animation.

14. A user input apparatus according to claim 13, in which the first input port is operable to receive inputs corresponding to one or more of:
    i. a videogame controller, headset, phone, or video camera for voice;
    ii. a phone or video camera for video images;
    iii. a videogame controller, phone, or video camera for gestures;
    iv. a videogame controller, headset, phone, or video camera for words; and v. a videogame controller, or biometric sensor for biometrics.

* * * * *